United States Patent
Muench et al.

(10) Patent No.: US 9,419,333 B1
(45) Date of Patent: Aug. 16, 2016

(54) STACKS HAVING HERMETIC CAPPING LAYERS OVER POROUS CERAMIC MATRIX COMPOSITE STRUCTURES

(71) Applicant: The Boeing Company, Chicago, IL (US)

(72) Inventors: MaryAnn S. Muench, La Mirada, CA (US); Robert A. DiChiara, Carlsbad, CA (US); William Harrigan, Huntington Beach, CA (US); Kevin R. Lenihan, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 166 days.

(21) Appl. No.: 14/250,197

(22) Filed: Apr. 10, 2014

(51) Int. Cl.
*H01Q 1/42* (2006.01)
*B05D 5/00* (2006.01)

(52) U.S. Cl.
CPC . *H01Q 1/422* (2013.01); *B05D 5/00* (2013.01)

(58) Field of Classification Search
CPC .... B05D 5/00; Y10T 428/25; Y10T 428/257; Y10T 428/26; F01D 5/282; F01D 5/284; F01D 5/288; B32B 5/00; B32B 9/04; B32B 18/00; H01Q 1/42; H01Q 1/422; H01Q 1/424
USPC .............. 428/158, 323, 329, 446, 701, 304.4; 343/872

See application file for complete search history.

(56) References Cited

U.S. PATENT DOCUMENTS

| 8,323,796 B2 | 12/2012 | Schmidt et al. |
| 2011/0111211 A1* | 5/2011 | Golecki ............... C04B 35/803 428/329 |

* cited by examiner

*Primary Examiner* — Catherine A Simone
(74) *Attorney, Agent, or Firm* — Kwan & Olynick LLP

(57) ABSTRACT

Provided are stacks including CMC structures and capping layers deposited on surfaces of these CMC structures. Also provided are methods for hermetically sealing the surfaces of the CMC structures with the capping layers. These stacks may be used to construct walls of radomes that enclose antennas and other equipment of aerospace vehicles. The capping layers may form smooth external surfaces of the radomes and may hermetically seal the underlying CMC structures. The dielectric properties of these stacks may be configured to minimize interference with operations of the antennas and other equipment deposited within the radome.

19 Claims, 5 Drawing Sheets

STACKS HAVING HERMETIC CAPPING LAYERS OVER POROUS CERAMIC MATRIX COMPOSITE STRUCTURES

BACKGROUND

Composites are made from two or more materials that remain separate and distinct on a macroscopic level while forming single-body components. Matrix materials and reinforcement materials are two main components of the composites. The reinforcement materials may be stronger and stiffer than the matrix materials and may impart special physical (mechanical and electrical) properties to enhance properties of the matrix materials. In a typical composite structure, a matrix material surrounds and supports reinforcement structures by maintaining relative positions of these structures. The synergetic effect of this combination produces material properties that are superior to that of the matrix and/or reinforcement.

Ceramic matrix composites (CMCs) are specific types of composites that include ceramic matrix materials and, in some instances, ceramic reinforcement materials. Structures formed from CMCs have relatively high mechanical strengths that are often retained at high temperatures. This type of composite materials may be designed to withstand physically demanding conditions, such as high temperatures, oxidation, and the like often associate with aerospace applications.

Some commonly used CMC materials include glass CMCs, organo-metallic CMCs, and non-oxide CMCs. However, these CMC materials are not applicable for many aerospace applications, such as shielding radomes. For example, organo-metallic ceramics have high dielectric constants and are susceptible to oxidation. Non-oxide CMCs often begin to crack at typically about 10 ksi. Other CMC materials change their properties with temperature fluctuations. Furthermore, many CMC materials do not provide hermetically sealing often needed to maintain particular environments, such inside compartments of radomes.

SUMMARY

Provided are stacks formed from CMC structures and capping layers deposited on surfaces of the CMC structures. Also provided are methods for hermetically sealing the surfaces of the CMC structures with the capping layers. These stacks may be used to construct walls of radomes that enclose antennas and other equipment of aerospace vehicles. The capping layer form smooth external surfaces of the radomes and may hermetically seal the underlying CMC structures. The dielectric properties of these stacks may be configured to minimize interference with operations of the antennas and other equipment deposited within the radome. The CMC structures and/or the capping layers may be formed from various oxides further described below. In these examples, such CMC structures may be referred to as oxide CMC structures, while such capping payers may be referred to as oxide capping layers.

In some aspects, a stack includes a CMC structure and a capping layer. The CMC structure has a surface on which the capping layer is deposited. The CMC structure includes ceramic fibers infiltrated with a ceramic matrix or, more specifically, with an oxide ceramic matrix. The ceramic fibers include a first oxide, while the ceramic matrix includes a second oxide, which may be the same or different than the first oxide. The CMC structure has an average porosity of at least about 20% or, more specifically, or at least about 30%. The capping layer forms a hermetic seal on the surface of the CMC structure. The capping layer comprises a third oxide, which may be the same or different than the first oxide and/or the second oxide of the CMC structure. The capping layer may be formed from a combination of cordierite, aluminum oxide, boron oxide, calcium oxide, magnesium oxide, silicon dioxide, methocellulose, and ethyl alcohol. The ethyl alcohol may be used as a medium (e.g., a solvent), while the methocellulose may be used as a binding agent.

In some aspects, a portion of the capping layer penetrates into the CMC structure and forms an overlapping zone. In other words, the overlapping zone includes portion of both the capping layer and the CMC structure. The average thickness of the overlapping zone may be less than 1% of the thickness of the CMC structure. In some aspects, the average thickness of the capping layer portion extending above the surface of the CMC structure and, therefore, above the overlapping zone, is between about 100 micrometers and 500 micrometers. Even at the lower thickness range, the capping layer is capable of maintaining a hermetic seal.

In some aspects, the dielectric constant (E') of the capping layer does not exceed the dielectric constant of the CMC structure by more than 2. Furthermore, the coefficient of thermal expansion of the capping layer may be less than or equal to the coefficient of thermal expansion of the CMC structure placing the capping layer in compression. The surface roughness of the capping layer may be less than 50 Ra.

In some aspects, the third oxide of the capping layer has a different composition than the second oxide of the ceramic matrix of the CMC structure. Furthermore, the third oxide may have a different composition than the first oxide of the ceramic fibers of the CMC structure. Likewise, the first oxide may have a different composition that the second oxide. In some aspects, the third oxide comprises cordierite. More generally, the third oxide may include one or more of aluminum oxide, boron oxide, calcium oxide, magnesium oxide, and silicon oxide. In some aspects, the concentration of carbon in the CMC structure may be substantially free of carbon. Likewise, the capping layer may be substantially free of carbon.

Also provided is a method for hermetically sealing a surface of a CMC structure. The method may involve providing the CMC structure including ceramic fibers and ceramic matrix. More specifically, the ceramic fibers are embedded into the ceramic matrix forming the CMC structure. The ceramic fibers include a first oxide, while the ceramic matrix includes a second oxide. In some aspects, the CMC structure has an average porosity of at least about 20% or, more specifically, of at least about 30%. The method may proceed with depositing a slurry (e.g., a ceramic-based slurry) onto the surface of the CMC structure. The slurry includes an oxide, solvent, and binder. In some aspects, application of the slurry onto the surface of the CMC structure is via a spray-on process.

The method proceeds with treating the CMC structure having the slurry on its surface. This operation may proceed in an oxygen containing environment. The capping layer includes the oxide and, in some aspects, may be sufficiently free from other components.

In some aspects, heat treatment of the capping layer involves multiple stages. For example, the first stage is performed at temperature of less than about 100° C., wherein solvents are removed producing a green body, which may be also referred to as a partially fabricated capping layer. In some aspects, the first stage is performed at a room temperature. In some aspects, the first partially fabricated capping layer is essentially free of solvent at the end of the first stage.

The second stage is performed at a temperature of between about 150° C. and 500° C. During this stage, the binder is removed from the first partially fabricated capping layer, and a second partially fabricated capping layer is formed from the first partially fabricated capping layer. The binder may be removed by thermolysis, which may be performed in an oxygen containing environment. In fact, the presence of oxygen in the environment helps to burn the organic material leaving primarily ceramic oxide. The second partially fabricated capping layer includes the oxide, which may be one or more of aluminum oxide, boron oxide, calcium oxide, magnesium oxide, and silicon oxide. In some aspects, the second partially fabricated capping layer is made essentially of this oxide and may be substantially free from other components prior to performing the third stage. In some aspects, the second partially fabricated capping layer is substantially free of carbon.

The third stage is performed at a temperature of at least about 800° C. During this stage, the second partially fabricated capping layer is melted and redistributed on the surface of the CMC structure thereby forming the capping layer. For example, the second partially fabricated capping layer may flow into pores of the CMC structure to form an overlapping layer. In some aspects, some of the oxide may be present in the pores of the CMC structure after depositing the slurry.

These and other aspects are described further below with reference to the figures.

DETAILED DESCRIPTION

Figure 1A:
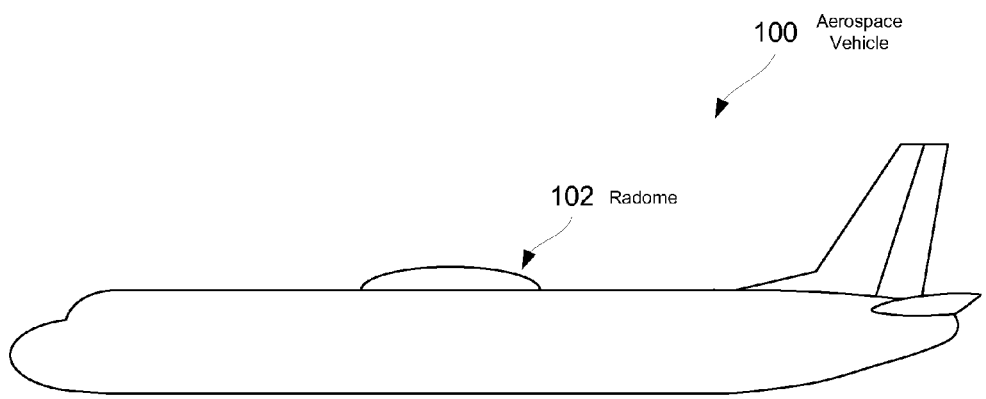
FIGS. 1A and 1B are schematic representations of an aerospace vehicle including a radome, in accordance with some aspects.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific aspects, it will be understood that these aspects are not intended to be limiting.

Introduction

Radomes are structures used on aerospace vehicle to protect antennas (e.g., radar antennas) and associated equipment from environmental exposure. As such, radomes may need to meet various physical and electromagnetic requirements and specifications. For example, a radome may be aerodynamic and having a smooth external surface. Furthermore, materials forming a radome may need to withstand physical and thermal stresses encountered during operation (e.g., flight) of the aerospace vehicles. These materials also need to have minimum transmission losses, reflected power, beam deflections, and pattern distortions to ensure proper operations of the antenna enclosed in the radome. Furthermore, some radomes may need to hermetically seal their internal compartments, for example, to prevent gases from escaping these compartments and to prevent various contaminants from entering these compartments.

For purposes of this disclosure, a radome is defined as any structure configured to enclose and protect an antenna from environmental exposure and to transmit electromagnetic radiation to and/or from the antenna. Radomes may have any shapes or configurations. For example, radomes may have dome shapes, cone shapes, sphere shapes, and other shapes. Furthermore, radomes may be configured to transmit various ranges of frequencies of electromagnetic radiation therethrough.

Radomes are generally hollow structures. Their walls may be formed as a stack of two or more components. For example, the stack may include a thick inner structure and a thin capping layer. The capping layer may be also referred to as a skin layer or simply a skin. The inner structure may be formed from materials having low dielectric constants (E') and low dielectric loss (E") and, in some aspects, may be porous. For example, foam, honeycomb, or any other like porous structure may be used for this component. The capping layer materials may also have low E' and E". However, because the capping layers are generally thinner than the inner structures, the low dielectric constants of the materials used for the capping layers may be somewhat higher than that for the inner structures. Even with a higher dielectric constant, a thinner capping layer has a small effect on the overall electromagnetic characteristics of the radome. In some aspects, the E' value of the capping layer is substantially the same (e.g., within about 10% or even within about 5%) of the E' value of the porous CMC, so as to minimize beam defection and distortion. Furthermore, the surfaces of high speed aerospace vehicles, may be subjected to significant aerodynamic heating, mechanical stresses, and erosion. Radomes used for these applications need to have a good high temperature strength and suitable dielectric properties within the entire temperature range.

While silica and silicon nitride meet some of the above-listed requirements and have been used for some radome applications, there are some significant limitations associated with these materials. For example, silicon nitride structures fabricated using standard ceramic production methods (e.g., sintering aids, milling media) have a higher dielectric constant compared to the porous oxide CMC and higher dielectric losses (E"), which constantly changes due to temperature fluctuations during use. Specifically, the millimeter wave dielectric constants of hot-pressed or reaction bonded silicon nitride structures are between about 7.5 are 9.5. Building radomes from such materials often demands absolute thickness tolerances, often better than 0.001 inch, which makes production extremely expensive if possible at all. Additionally, when these materials are used, the power transmission and phase shift through the radome walls is strongly dependent on the incident angle. As a result, angular ranges of antennas shielded by these radomes are limited, and these radomes have excessive reflective power losses as well as sight errors. Furthermore, many conventional materials have unstable dielectric constants and dielectric losses that tend to significantly change with temperature. This is compounded by the fact that during flight the radome heats up unevenly and the temperature constantly changes over time. For these materials, matching the wall thickness to the antenna design is simply not possible.

Provided are stacks including CMC structures and capping layers deposited on surfaces of the CMC structures for radome and other like applications on aerospace vehicles. These stacks have low and thermally stable dielectric properties and smooth surface achieved by using specific oxide materials for their construction. For example, a CMC structure may include ceramic fibers and ceramic matrix, both formed from oxides. "Oxides" as used herein include, but are not limited to aluminum oxide, boron oxide, calcium oxide, magnesium oxide, or silicon oxide. More specifically, capping layer 306 may include each of aluminum oxide, boron oxide, calcium oxide, magnesium oxide, and silicon oxide. The CMC structure may have porosity of at least about 20% or even at least about 30%. The techniques for determining porosity may be based on comparing densities of porous and non-porous materials that otherwise have the same composition. This high porosity ensures a low dielectric constant of the CMC structure. Using an oxide for the CMC structure provides low losses (E"), transmission losses, reflected power, beam deflection, and pattern distortion. Furthermore, oxides tend to be more thermally stable than other materials conventionally used for CMC. A capping layer is disposed on the surface of the CMC structure and hermetically seals this surface. The capping layer may be also formed from an oxide, which may be the same or different than oxides of the CMC structure.

The hermetic capping layer forms an external surface of the stack and protects the CMC structure from detrimental effects caused by high temperatures and various environmental conditions. The capping layer may have a coefficient of thermal expansion (CTE) that is lower than that of the CMC structure, which creates compression forces acting on the cap layer into compression mode and prevents the capping layer from crazing. Furthermore, tempering of the capping layer increases the overall mechanical strength of the stack. The hermetic sealing characteristics of the capping layer also allows the components enclosed by the CMC structure (e.g., an antenna deposited within a radome) to be contained within its own inert atmosphere. The inert atmosphere may be used to prevent oxidation of the enclosed components or, more generally, to protect from the environmental effects. Furthermore, porous CMC structures may be used together with such capping layers forming an overall hermetic stack. Without capping layers, the porosity makes these CMC structures susceptible to surface contaminants and makes them permeable in some cases. The capping layer provides a hermetic seal without significantly affecting the overall weight of the stack. Furthermore, application of the capping layer onto the CMC structure reduces surface roughness of the resulting stack in comparison with the uncoated CMC structure thereby enhancing aerodynamic characteristics and abrasion resistance. In some aspects, a capping layer and a CMC structure have E' values that are substantially the same (e.g., differing by less than 10% or even by less than 5%). As further described below, the capping layer may penetrate into the CMC structure for adhesion thereby forming an overlapping zone. However, this penetration is limited to preserve porosity of the CMC structure and corresponding characteristics, such as strength and fracture toughness.

Provided also are methods for hermetically sealing surfaces of CMC structures. These methods involve depositing slurries onto CMC structured and treating the CMC structures to form capping layers and to fuse these capping layers to the surfaces of the CMC structures. The deposition may be performed using sprayed on techniques. The heating may be performed in an oxygen containing environment, e.g., an ambient environment, since oxides are used for the CMC structures and the capping layer and, as such, there is no need to prevent oxidation during this operation. The heating may be performed using different stages specifically tailored to organic components from the capping layers as these layers are being formed without leaving any residual carbon, which could increase E" and reduce performance.

A brief description of a general aerospace vehicle is presented below to provide better understanding of various features of the stacks including CMC structures and capping layers. For purposes of this disclosure, an aerospace vehicle is defined as any device, apparatus, system, or vehicle designed and constructed for traveling through the air substantially within the Earth's atmosphere and through space outside the Earth's atmosphere. Some examples of aerospace vehicles include aircraft, airplanes, rockets, missiles, spacecraft, satellites, space stations, and the like.

Figure 1B:
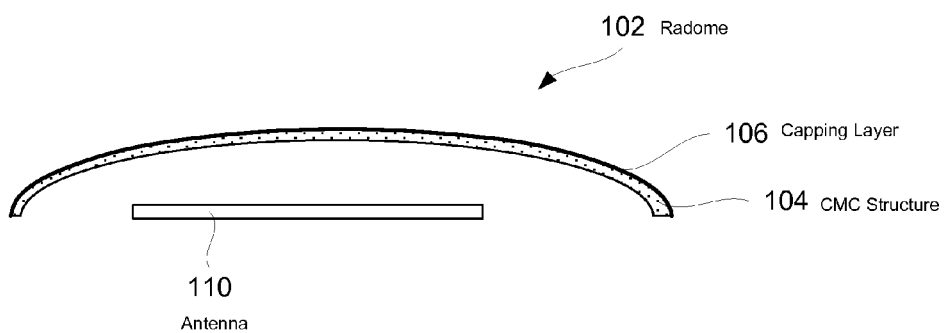
Figure 2:
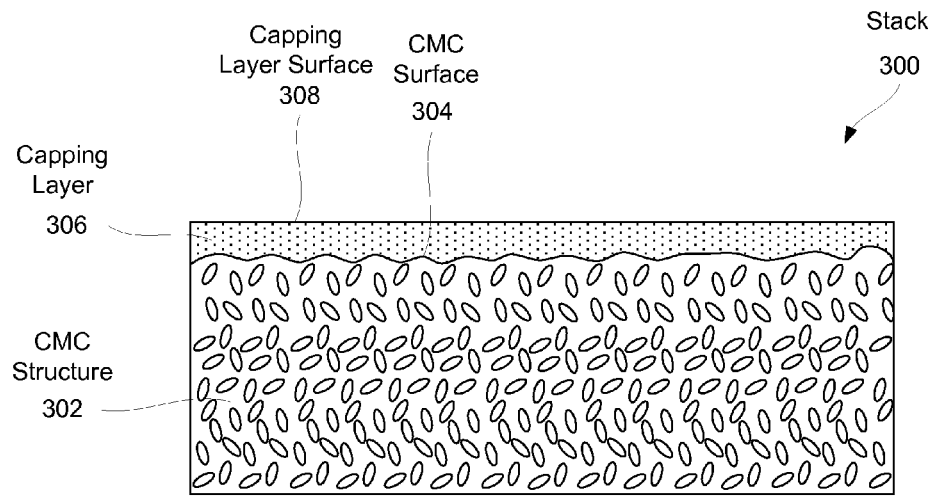
FIG. 2 is a schematic representation of a stack including a CMC structure and a capping layer, in accordance with some aspects.

FIG. 1A is a schematic representation of one example of aerospace vehicle 100, in accordance with some aspects. Different examples of aerospace vehicles are described above. Even though aerospace vehicle 100 is illustrated as an aircraft, one having ordinary skills in the art would understand that these features are applicable to other types of aerospace vehicles. Aerospace vehicle 100 includes a radome 102 positioned on its body, e.g., a top portion of a fuselage as shown in FIG. 1A or a forward end of a fuselage for other applications. Radome 102 may be designed, configured, and constructed to protect antenna 110 shown in FIG. 1B from environmental conditions (e.g., wind, rain, dust, moisture, etc.) as aerospace vehicle 100 travels through the air at high velocity. Radome 102 may have stacked walls formed by a CMC structure 104 and a capping layer 106 disposed on CMC structure 104 and forming an external surface of radome 102. Various examples of stacks formed by capping layer and CMC structures are described below with reference to FIGS. 2 and 3.

Examples of Stacks Including CMC Structures and Capping Layers

FIG. is a schematic illustration of stack 300 including CMC structure 302 and capping layer 306 disposed on surface 304 of CMC structure 302, in accordance with some aspects. CMC structure 302 may be formed from ceramic fibers and ceramic matrix, both made from one or more oxides, such as aluminum oxide, and silicon oxide. In some aspects, the material of the ceramic fibers is different from the material of ceramic matrix. Alternatively, the material of the ceramic fibers may be the same as the material of ceramic matrix. Overall, the ceramic fibers are embedded into the ceramic matrix forming CMC structure 302. In some aspects, CMC structure 302 is substantially free from carbon. For example, CMC structure 302 may have a concentration of carbon of less than 0.1% atomic. Carbon in CMC structure 302 can raise the E" value and may cause electromagnetic interference.

CMC structure 302 may be a porous structure. Porosity reduces the dielectric constant of CMC structure 302. In some aspects, the average porosity of CMC structure 302 is at least about 20% or, more specifically, at least about 30%. On the other hand, porosity makes CMC structure 302 permeable and allows contaminants from the outside environment and from the internal enclosure to get into CMC structure 302 and even to pass through CMC structure 302. For example, CMC structure 302 may be used to enclose a pressurized environment containing nitrogen and/or some other gases. With 5-20% porosity and about 3-5 millimeters thickness (for example), CMC structure 302 is highly permeable to gases.

CMC structure 302 includes surface 304 having an average roughness of at least about 100 Ra, such as about 200 Ra.

Forming a smoother surface may be difficult and require specialized polishing equipment. Furthermore, porosity of CMC structure 302 limits the smoothness of surface 304. Using surface 304 as an external surface of a radome, for example, may not be possible due to a high drag coefficient causing excessing heating and other issues. On the other hand, roughness of surface 304 is helpful for bonding to capping layer 306, which in turn forms smooth external surface 308. In other words, surface 304 of CMC structure 302 serves as interface between capping layer 306 and CMC structure 302.

Capping layer 306 is disposed on surface 304 of CMC structure 302 and forms a hermetic seal on that surface 304. For purposes of this disclosure, the hermetic seal is defined as a structure that is substantially impermeable to moisture and/or gases. Capping layer 306 may include an oxide, which may be different from or the same as the oxide of the ceramic fibers and/or the oxide of the ceramic matrix of CMC structure 302. In some aspects, capping layer 306 includes at least one of aluminum oxide, boron oxide, calcium oxide, magnesium oxide, or silicon oxide. More specifically, capping layer 306 may include each of aluminum oxide, boron oxide, calcium oxide, magnesium oxide, and silicon oxide.

In some aspects, capping layer 306 includes cordierite, which is magnesium aluminum silicate ($2MgO.2Al_2O_3.5SiO_2$) or in some cased magnesium iron aluminum cyclo-silicate (($Mg,Fe)_2Al_4Si_5O_{18}$) since solid solution exists between Mg-rich cordierite and Fe Capping layer 306 may include glass frit. The amount of the glass frit to the cordierite in capping layer 306 may be between about 5 and 20 by weight or, more specifically, between about 7 and 15 by weight, such as about 10 by weight.

In some aspects, capping layer 306 is substantially free from carbon or, more specifically, capping layer 306 has a concentration of carbon less than 0.1% atomic. The reasons for excluding carbon from capping layer 306 are generally the same as the reasons for excluding carbon from CMC structure as described above.

The average thickness of capping layer 306 may be between about 100 micrometers and 500 micrometers or, more specifically, between about 200 micrometers and 400 micrometers. Layers that are thinner than the specified ranges may not provide sufficient coverage and/or hermetic sealing. Thinner layers may be porous and not sufficiently conformal and suitable for described applications. On the other hand, thicker layers may be prone to damage, could be susceptible thermal shock (e.g., due to mismatch of thermal coefficient) or cause undesirable interference with radar signals and weight increase of the overall stack. The interference and weight increase are due to the lack of porosity in the capping layer 306 in comparison to a substantial porosity of CMC structure 312.

Figure 3:
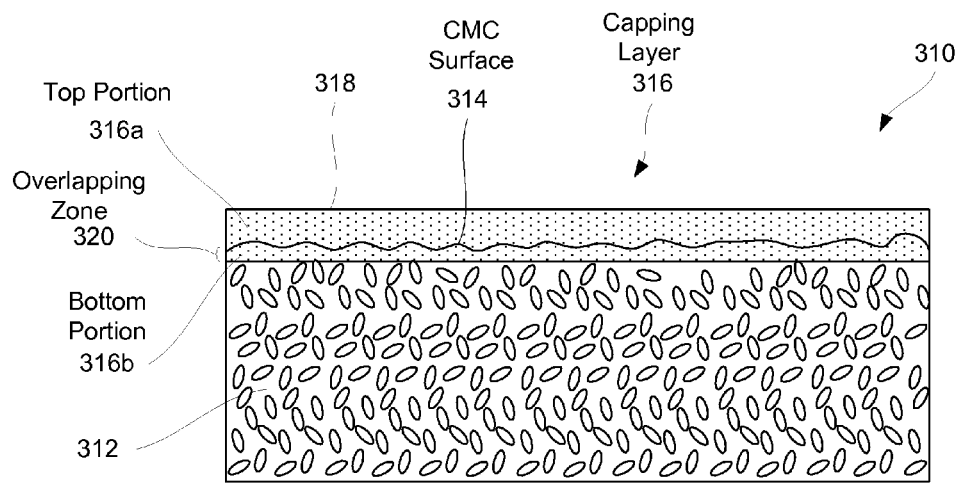
FIG. 3 is a schematic representation of a stack including a CMC structure and a capping layer such that portions of the CMC structure and the capping layer form an overlapping zone, in accordance with some aspects.

In some aspects, a portion of a capping layer 316 penetrates into CMC structure 312 as, for example, shown in FIG. 3, thereby forming an overlapping zone 320. Overlapping zone 320 is defined as a zone that includes both bottom portion 316b of capping layer 316 and a top portion of CMC structure 312. Overlapping zone 320 may have a lower porosity than the remaining bottom portion of CMC structure 312. Specifically, the pores of the top portion of CMC structure 312 may be filled with portion 316b of capping layer 316.

In some aspects, the average thickness of overlapping zone 320 is less than about 1% of the thickness of CMC structure 312 or, more specifically, less than about 0.5% of the thickness of CMC structure 312. This thickness of overlapping zone 320 may be less than about 250 micrometers or, more specifically, less than about 100 micrometers. A larger thickness of overlapping zone 320 may have a negative impact on the dielectric characteristics of the overall stack 310 and may not be suitable radome and other like applications. At the same time, a very thin overlapping zone may not provide sufficient mechanical bonding between capping layer 316 and CMC structure 312. Furthermore, overlapping zone 320 may help with hermetically sealing CMC structure 312.

Top portion 316a of capping layer extends above surface 314 of CMC structure 312 and does not penetrate into CMC structure 312. As such, top portion 316a is not a part of overlapping zone 320. In some aspects, the average thickness of top portion 316a of capping layer 316 is between about 20 micrometers and 500 micrometers or, more specifically less than about 100 micrometers. As with overlapping zone 320, a larger thickness may have a negative effect on the dielectric characteristics of the overall stack 310 and may restrict certain applications. On the other hand, a very thin top portion 316a may not provide sufficient sealing surface 314 of CMC structure 312.

In some aspects, the dielectric constant of capping layer 316 does not exceed the dielectric constant of CMC structure 312 by more than 2. More specifically, the dielectric constants of capping layer 316 and CMC structure 312 do not vary by more than 1.5 or even by more than 1. In some aspects, the coefficient of thermal expansion of capping layer 316 is less than or equal to the coefficient of thermal expansion of CMC structure 312. In some aspects, the average surface roughness of surface 318 of capping layer 316 is less than the average surface roughness of surface 314 of CMC structure 312. In some aspects, the average surface roughness of surface 318 of capping layer 316 is less than 50 Ra or even less than 40 Ra.

Processing Examples

Figure 4:
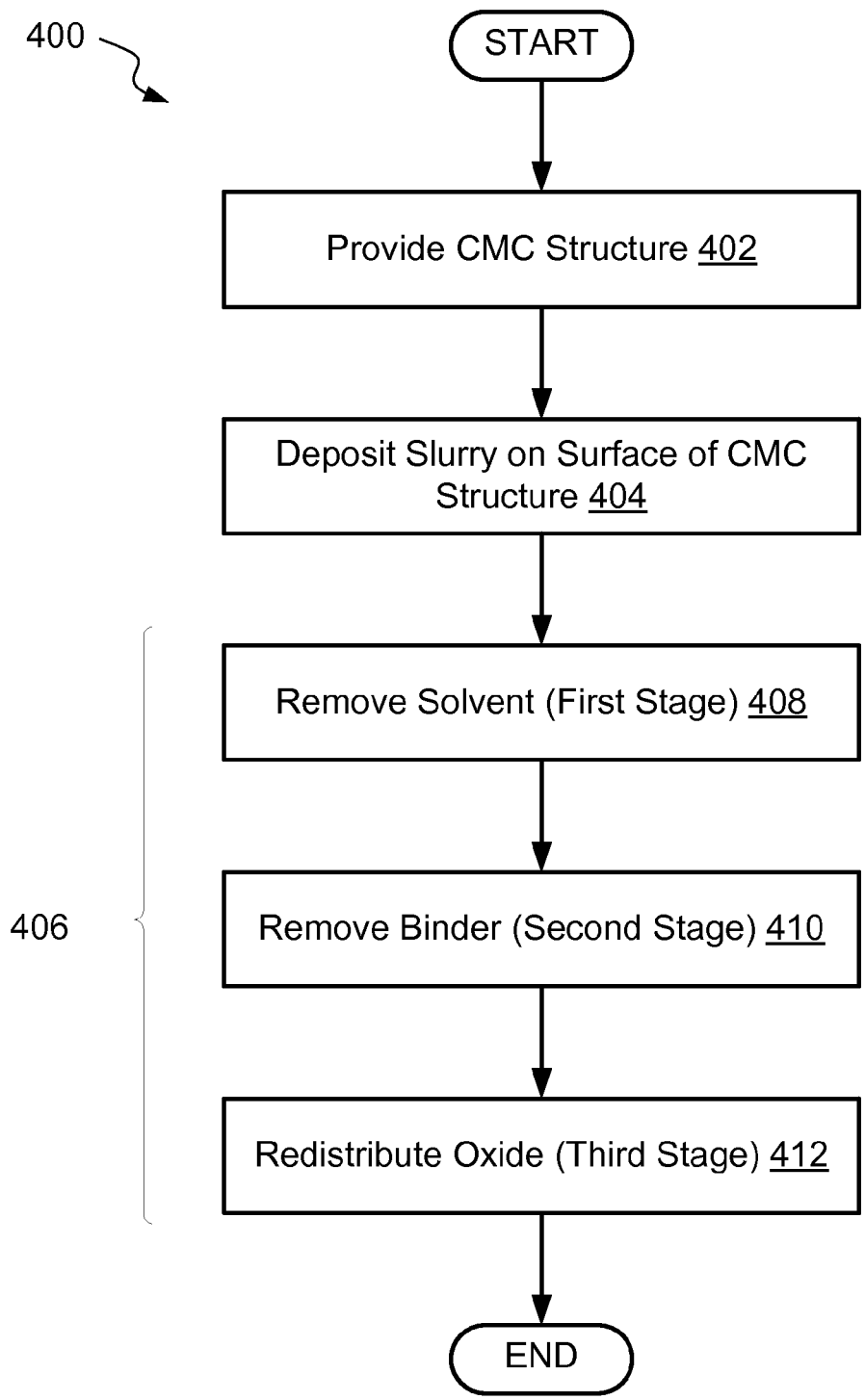
FIG. 4 is a process flowchart corresponding to a method of hermetically sealing a surface of a CMC structure with a capping layer, in accordance with some aspects.
Figure 5A:
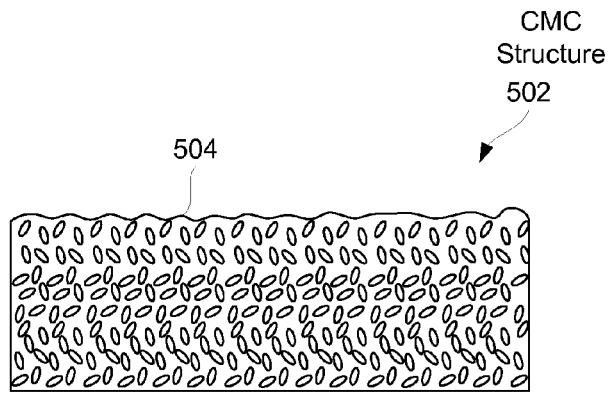
FIGS. 5A-5E are schematic representations of different stages during fabrication of a stack including a CMC structure and a capping layer, in accordance with some aspects.

FIG. 4 is a process flowchart corresponding to a method 400 for hermetically sealing a surface of a CMC structure, in accordance with some aspects. Method 400 may commence with providing the CMC structure during operation 402. The CMC structure may include ceramic fibers and ceramic matrix. Specifically, the ceramic fibers are embedded into the ceramic matrix forming the CMC structure. The CMC structure has an average porosity of at least about 20% prior to subsequent operations and, in some aspects, after completing method 400. Various examples of CMC structures are described above with reference to FIGS. 2 and 3. FIG. 5A is a schematic illustration of a CMC structure 502 prior to depositing slurry onto its surface 504.

Returning to FIG. 4, method 400 may proceed with depositing slurry onto the surface of the CMC structure during operation 404. Spray coating and other techniques may be used during this operation. In some aspects, some slurry is introduced into the pores of the CMC structure during or after operation 404. For example, some pressure (e.g., mechanical contact or vacuum-pressure cycles) may be used to force the slurry into the pores.

The slurry may include an oxide, a solvent, and a binder. The oxide may include one or more of aluminum oxide, boron oxide, calcium oxide, magnesium oxide, and silicon oxide. These components may be in the form of glass frit. In some aspects, the oxide may also include cordierite. In some aspects, cordierite may be combined or replaced with mullite, alumina, and zirconia, or mixtures thereof. The amount of the oxide in the slurry may be between about 30% and 70% by weight or, more specifically, between about 40% and 60% by weight, such as about 50%. This amount allows having a suitable processing viscosity of the slurry, which is controlled by adding solvent, and sufficient amount of binder that temporary holds the oxide during further processing. The excessive amount of the oxide may cause the slutty to be too thick and not suitable for various processing techniques, such as spray-on technique. Furthermore, the binder allows holding the stack structure together during subsequent processing. In specific aspects, a combination of a glass frit and cordierite may be used for the oxide. In these examples, the weight ratio of the glass frit to the cordierite may be between about 5 and 20 or, more specifically, between about 8 and 15, such as about 10.

Figure 5B:
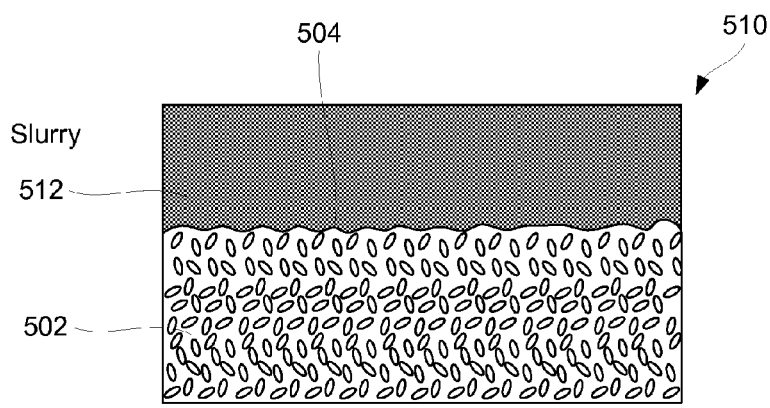

The solvent used in the slurry may be an alcohol (e.g., ethyl alcohol) or any other suitable solvent. The weight ratio of the solvent in the slurry may be between about 20% and 60% or, more specifically, between about 30% and 50% such as about 40%. The binder may be methocellulose or any other suitable binder. As noted above, the amount of solvent is used to control the viscosity of the slurry. Different deposition techniques may require different slurry viscosities and the amount of solvent may be adjusted accordingly. The weight ratio of the binder in the slurry may be between about 3% and 15% or, more specifically, between about 5% and 12% such as about 8%. As noted above, the binder is used as a temporary support for the oxide structures. The binder is later removed. In general, the amount of the binder should be kept to a minimum to avoid contamination of the resulting structure with carbon, which is component of most polymer based binders. On the other hand, insufficient amounts of binder may cause the structure to cause the shape and not provide enough coverage during subsequent processing. FIG. 5B is a schematic illustration of a partially fabricated assembly 510 having CMC structure 502 with a slurry layer 512 disposed on surface 504 of CMC structure 502.

Returning to FIG. 4, method 400 may proceed with treating the CMC structure with the slurry deposited on its surface during operation 406. This treatment may be performed in an oxygen containing environment. A capping layer is formed on the surface of the CMC structure during this operation. The capping layer includes one or more oxides that were present the slurry. In some aspects, the capping layer is made substantially of these one or more oxides. The amount of other materials in the capping layer may be less than 1% by weight and even less than 0.1% by weight. In other words, substantially no other components are present in the capping layer. The solvent and the binder of the slurry may be completely removed during operation 406.

Figure 5C:
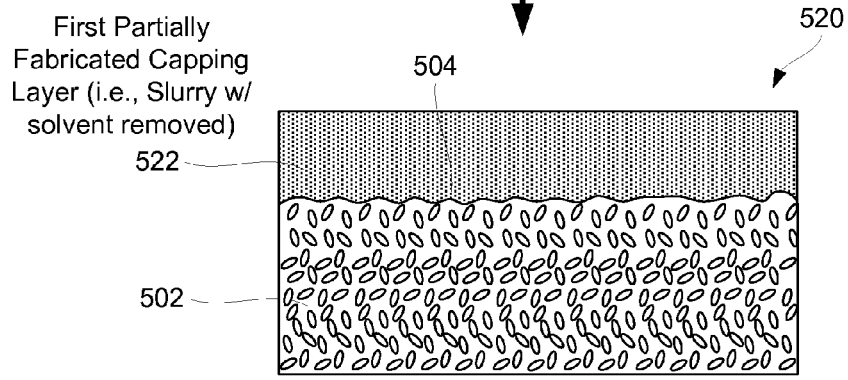

In some aspects, operation 406 includes is performed in stages with different temperatures used at each stage. For example, operation 406 may include a first stage 408, a second stage 410, and a third stage 412. First stage 408 is performed before second stage 410, which in turn is performed before third stage 412. First stage 408 may be performed at a temperature of less than 100° C. and sometimes at about room temperature. During first stage 408, the solvent is removed from the slurry deposited on the surface of the CMC structure. A first partially fabricated capping layer is formed from the slurry on that surface during this first phase 408. In some aspects, the first partially fabricated capping layer is substantially free from any solvents used in the slurry after completing first stage 408. Removal of the solvent at low temperatures ensures that when the first partially fabricated capping layer is later heated to higher temperatures (during later stages) bubbling and forming porous structures is prevented. Unlike, the CMC structure, the porosity of the capping layer should be minimal or substantially 0%. The temperature and duration of first stage 408 may depend on the type of the solvent, the amount of solvent in the slurry and other factors. FIG. 5C is a schematic illustration of a partially fabricated assembly 520 having CMC structure 502 with a first partially fabricated capping layer 522 disposed on surface 504 of CMC structure 502.

Figure 5D:
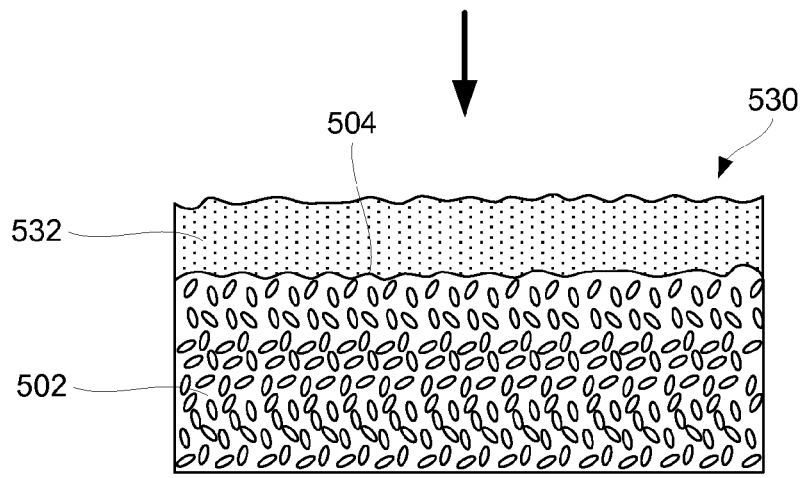

Second stage 410 may be performed at a temperature of between 150° C. and 500° C. During second stage 410, the binder is removed from the first partially fabricated capping layer (formed during first stage 408). As a result of this binder removal, a second partially fabricated capping layer is formed from the first partially fabricated capping layer on the surface of the CMC structure. The second partially fabricated capping layer may have substantially no binder or solvent residues in the layer. The second partially fabricated capping layer may be made essentially of the oxide used to form the slurry. Furthermore, the second partially fabricated capping layer may be substantially free from carbon or, more specifically, the concentration of carbon in the second partially fabricated capping layer may be less than 0.1% atomic prior to performing the third stage. To ensure removal of carbon during formation of the second partially fabricated capping layer, second stage 410 and, in some aspects, third stage 412 may be performed in an oxygen containing environment, such an ambient environment with an oxygen concentration of between about 10% and 30% by volume (at the room temperature). FIG. 5D is a schematic illustration of a partially fabricated assembly 530 having CMC structure 502 with a first partially fabricated capping layer 532 disposed on surface 504 of CMC structure 502.

Figure 5E:
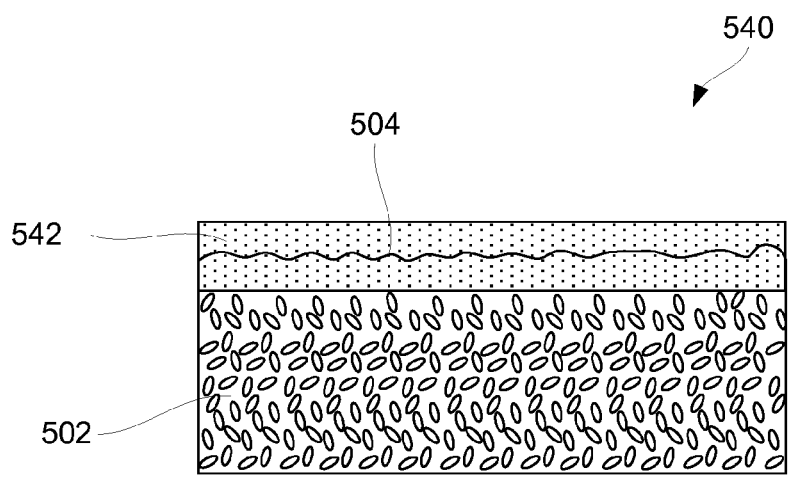

Third stage 412 may be performed at a temperature of at least 800° C. During third stage 412, the second partially fabricated capping layer is melted and redistributed on the surface of the CMC structure. The capping layer is formed from the second partially fabricated capping layer during this stage. In some aspects, redistribution of the second partially fabricated capping layer on the surface of the CMC structure may involve introducing a portion of the second partially fabricated capping layer into pores of the CMC structure thereby forming an overlapping zone. Furthermore, redistribution of the second partially fabricated capping layer on the surface of the CMC structure may result in a capping layer having a smoother surface than the second partially fabricated capping layer. FIG. 5E is a schematic illustration of a stack 540 having CMC structure 502 with a capping layer 542 disposed on surface 504 of CMC structure 502 and partially penetrating into CMC structure 502.

Third stage 412 may be performed by heating the stack including the CMC structure and the second partially fabricated capping layer to the specified temperatures. For example, an oven may be used for this purpose. Alternatively, the heating may be focused on the second partially fabricated capping layer using, for example, a quartz heat lamp, heat guns, or blankets directed against the surface of the second partially fabricated capping layer. This surface heating may be used for manufacturing the stack and in some aspects for repairing the stack, e.g., an in situ repair and patching of ceramic tiles without removing them from the underlying structure, such as a frame. That is, if a ceramic article such as a protective thermal tile is damaged during service, the capping layer can be reformed by applying the slurry to the damaged area. High intensity lamps can be directed against the area to hear and form the capping layer.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present aspects are to be considered as illustrative and not restrictive.

What is claimed is:

1. A radome for enclosing an antenna on an aerospace vehicle, the radome comprising:
   a ceramic matrix composite (CMC) structure having a surface and comprising ceramic fibers and ceramic matrix,
      wherein the ceramic fibers are embedded into the ceramic matrix forming the CMC structure,
      wherein the ceramic fibers comprise a first oxide,
      wherein the ceramic matrix comprises a second oxide, and
      wherein the CMC structure has an average porosity of at least about 20%; and
   a capping layer deposited on the surface of the CMC structure and forming a hermetic seal on the surface of the CMC structure,
      wherein the capping layer comprises a third oxide,
      wherein a coefficient of thermal expansion of the capping layer is lower than a coefficient of thermal expansion of the CMC structure.

2. The radome of claim 1, wherein a portion of the capping layer penetrates into the CMC structure thereby forming an overlapping zone.

3. The radome of claim 2, wherein an average thickness of the overlapping zone is less than 1% of a thickness of the CMC structure.

4. The radome of claim 1, wherein an average thickness of the capping layer extending above the surface of the CMC structure is between about 100 micrometers and 500 micrometers.

5. The radome of claim 1, wherein the CMC structure has the average porosity of at least about 30%.

6. The radome of claim 1, wherein a dielectric constant of the capping layer does not exceed a dielectric constant of the CMC structure by more than 2.

7. The radome claim 1, wherein a surface roughness of a surface of the capping layer is less than 50 Ra.

8. The radome of claim 1, wherein the third oxide has a different composition than the second oxide and a different composition than the first oxide.

9. The radome of claim 1, wherein the third oxide comprises cordierite.

10. The radome claim 1, wherein the third oxide comprises one or more of aluminum oxide, boron oxide, calcium oxide, magnesium oxide, and silicon oxide.

11. The radome of claim 1, wherein the CMC structure is substantially free of carbon.

12. The radome of claim 1, wherein the capping layer is substantially free of carbon.

13. The radome of claim 1, wherein the third oxide comprises one or more of boron oxide, calcium oxide, and magnesium oxide.

14. The radome of claim 1, wherein the third oxide comprises magnesium aluminum silicate ($2MgO.2Al_2O_3.5SiO_2$).

15. The radome of claim 1, wherein the third oxide comprises magnesium iron aluminum cyclo-silicate (($Mg,Fe)_2Al_4Si_5O_{18}$).

16. The radome of claim 1, wherein a dielectric constant of the capping layer and a dielectric constant of the CMC structure differ by less than 10%.

17. The radome of claim 1, wherein the first oxide and the second oxide are same.

18. The radome of claim 1, wherein the radome structure is impermeable to gases.

19. The radome of claim 1, wherein a surface roughness of a surface of the CMC structure is at least about 100 Ra.

* * * * *